April 20, 1926.

H. SMITH 1,581,361

ASSEMBLY OF TREAD UNITS

Filed July 6, 1921

HARRY SMITH
INVENTOR

BY Hadley Freeman.
ATTORNEY

Patented Apr. 20, 1926.

1,581,361

UNITED STATES PATENT OFFICE.

HARRY SMITH, OF CUDAHY, WISCONSIN, ASSIGNOR, BY MESNE ASSIGNMENTS, TO THE FISK RUBBER COMPANY, OF CHICOPEE FALLS, MASSACHUSETTS, A CORPORATION OF MASSACHUSETTS.

ASSEMBLY OF TREAD UNITS.

Application filed July 6, 1921. Serial No. 482,836.

*To all whom it may concern:*

Be it known that I, HARRY SMITH, a citizen of the United States, and a resident of Cudahy, in the county of Milwaukee and State of Wisconsin, have invented certain new and useful Improvements in Assembly of Tread Units, of which the following is a specification.

My invention relates to the assembly of tread units and the principal object of my invention is to provide a new and improved method and apparatus for assembling such units. In the drawings accompanying this specification and forming a part thereof I have shown, for purposes of illustration, one form which my invention may assume. In these drawings:

Figure 2 is the same as Figure 1 except that the guide has been swung into operative position, while

Figure 1:
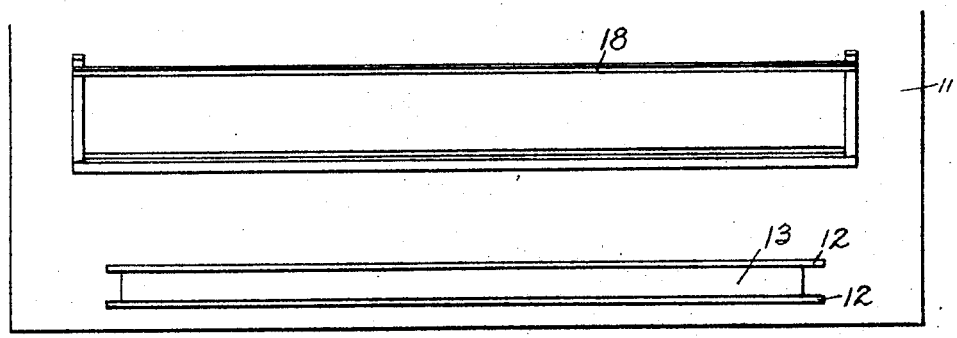
Figure 1 represents a general plan view of this illustrative embodiment showing the guide swung back out of operative position.

The device shown in the drawings consists of a table 11 provided with a pair of guides 12 adapted to receive between them a member of the tread unit such as the tread 13 and adjustable if desired in order to enable the same apparatus to be used for the assembly of tread units of different dimensions. Mounted on this table is a strip 14 to which is hinged at 15 a bar 16 which carries at its ends a pair of arms 17 which in turn support a guide bar 18 which may be detachably connected to the arms in order to permit the insert of different bars for different size treads and is connected at such a point that when swung forward as shown in Figure 2 it will assume a position adjacent the center of the tread 13.

Figure 2:
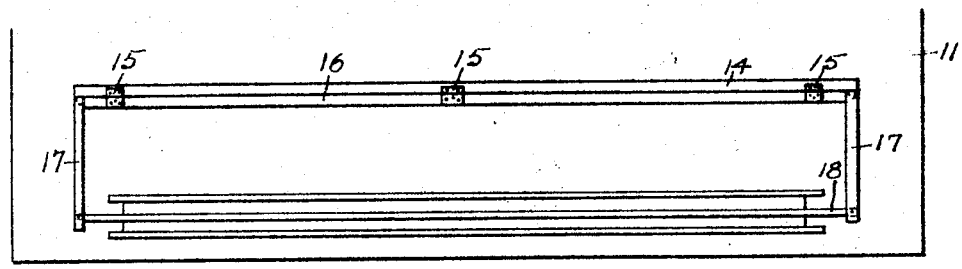
Figure 3:
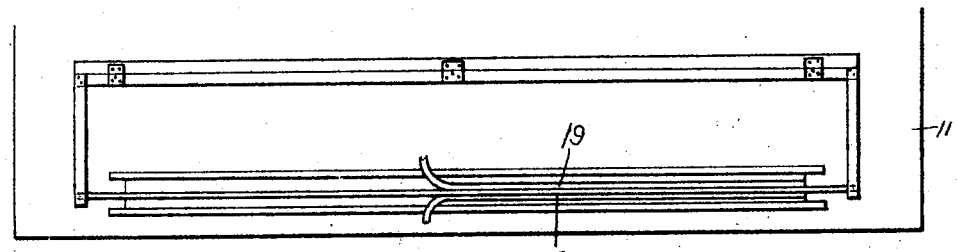
Figure 3 is the same as Figure 2 except that the split breaker is shown as partly positioned.

In operation the tread 13 is placed in position while the guide 18 is back as shown in Figure 1, the guide is then swung over as shown in Figure 2, the split breaker strips 19 are then laid in position as shown in Figure 3, and the guide is then swung back and the remaining part of the tread unit added.

The disclosure herein is illustrative only and is subject to various changes and modifications and my invention is, of course, not limited to the illustrative disclosure.

I claim:

A device for assembling tread units comprising stationary parallel guides adapted to position the longitudinal edges of a member of the tread unit, and a guide bar hinged to said table and adapted to be swung into a position adjacent the face of said member and in intermediate and parallel relation to said stationary guides.

In testimony whereof I have signed my name to the above specification.

HARRY SMITH.